United States Patent
Meyer et al.

(10) Patent No.: US 6,369,457 B1
(45) Date of Patent: Apr. 9, 2002

(54) METHOD FOR DRIVING THE INTERIOR LIGHTING OF VEHICLES

(75) Inventors: Martin Meyer, Frankfurt; Axel Schäfer, Kriftel, both of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/347,711

(22) Filed: Jul. 3, 1999

(30) Foreign Application Priority Data

Jul. 10, 1998 (DE) .......................... 198 30 873

(51) Int. Cl.[7] .............................. H02H 3/00
(52) U.S. Cl. ............... 307/10.1; 307/10.8; 307/9.1; 340/426; 180/287
(58) Field of Search .................. 307/10.1, 10.2, 307/10.8, 9.1; 340/426; 180/287

(56) References Cited

U.S. PATENT DOCUMENTS 5,744,875 A * 4/1998 Kleefeldt et al. .......... 307/10.2
5,998,928 A * 12/1999 Hipp ......................... 315/77

FOREIGN PATENT DOCUMENTS

| DE | 4022479 | 1/1992 |
| DE | 4228233 | 3/1994 |
| DE | 4330721 | 8/1994 |
| DE | 19530726 | 2/1997 |

\* cited by examiner

*Primary Examiner*—Josie Ballato
*Assistant Examiner*—Robert L. Deberadinis
(74) *Attorney, Agent, or Firm*—Martin A. Farber

(57) ABSTRACT

A vehicle having a central locking system for doors, tailgates or the like, as well as a device for illuminating an interior space of the vehicle, wherein the central locking system has a central control unit (1), and the central control unit (1) has an output (7) both for at least one actuating drive (2) and for the device for illuminating the interior space.

4 Claims, 1 Drawing Sheet

METHOD FOR DRIVING THE INTERIOR LIGHTING OF VEHICLES

FIELD AND BACKGROUND OF THE INVENTION

The invention relates to a vehicle having a central locking system as well as interior lighting.

Such vehicles having a device mentioned at the beginning are known. After an input command, for example by means of key actuation or the actuation of a remote control, the central locking system causes the doors, tailgates or the like of the vehicle, or their locking device, to be centrally locked, with the result that access to the vehicle is no longer possible, or to be centrally unlocked, with the result that access to the vehicle is thereby enabled.

In addition, it is known in the case of such vehicles that the means for illuminating the interior space are switched on when the door, the tailgate or the like is opened and are switched off again after the door, the tailgate or the like has been closed.

A multiplicity of cables are required both for the cabling of the central locking system to the individual actuating drives in the doors and the tailgate as well as for the means for illuminating the interior spaces, said cables increasing the weight of the vehicle and necessitating a high outlay on assembly.

SUMMARY OF THE INVENTION

The invention is based on the object, therefore, of providing a known vehicle of this type, with the requirement of a reduction in the outlay on materials and assembly.

The invention provides for the central locking system to have a central control unit, the central control unit having a common output both for at least one actuating drive and for the means for illuminating the interior space. From the output of the central control unit, a supply lead passes both to the actuating drive and to the means for illumination, with the result that mutually separate output stages and outputs and supply leads with respect to said elements can be obviated. The actuating drive is connected to the central control unit via a further lead, while the means for illuminating the interior space are connected up to ground, for example. The use of a common output both for the actuating drive and for the means for illuminating the interior space additionally has the advantage that the circulatory structure of the central control unit is reduced since it is possible to dispense with a further output stage and also an additional connector location (terminal).

Interior lighting is to be understood to mean the lighting in the passenger compartment, the lighting in the luggage compartment, in the glove box or the like, and this should also be understood to include further luminars such as, for example, entry luminars in the doors of automobiles or trucks.

In a development of the invention, the means for illuminating the interior space can be driven independently of or in dependence on the driving of the actuating drive. If, by way of example, the intention is for the means for illuminating the interior space to be switched on or switched off at the same time as the driving of the actuating drive, the supply lead for the actuating drive and the interior lighting is connected to the common output, the second supply lead to the actuating drive and the second supply lead to the interior lighting being at the same potential (either at the central control unit or at ground). If the intention is for the driving of the interior lighting to be effected independently of the driving of the actuating drive, the two return leads of the actuating drive and of the interior lighting are at different potentials.

In a development of the invention, the means for illuminating the interior space are assigned a device for luminosity regulation, which device can be driven by the central control unit. As a result, by way of example, in the event of driving of the actuating drive and simultaneous driving of the interior lighting, the latter cannot be switched on immediately but rather can be brought from the switched-off state to full luminosity. The same applies to the switching-off operation, with the result that when the door, the tailgate or the like is closed after entry or after the actuating drive has been driven in the sense of locking, the interior lighting is slowly regulated downward in terms of luminosity over a predetermined period of time.

In a development of the invention, the central control unit is connected up to means for detecting actuation of at least one handle of the door, the tailgate or the like, both the actuating drive and the means for illuminating the interior space being driven after actuation of a handle or of a lock element (for example the detection of the rotation of a rotary latch by means of a rotary latch switch) has been detected. This ensures that whenever a handle (such as, for example, an external door handle or an internal door handle) has been actuated, the interior lighting is also switched on. The common driving of the actuating drive and of the interior lighting from the central control unit thus has the advantage that separate means which detect that the door has opened, and in dependence on which the interior lighting is driven can be obviated. As a result, it is also possible to obviate receiving devices for these means in the bodywork (such as holes, for example) and their supply leads, whereby the outlay on materials and assembly is reduced further.

BRIEF DESCRIPTION OF THE DRAWINGS

An exemplary embodiment, to which the invention is not restricted, however, is described below and explained with reference to the sole FIGURE of the drawing, which sole FIG. 1. shows a central locking system for a vehicle.

DETAILED DESCRIPTION OF THE PREFERRED EMBODIMENT

Figure 1:
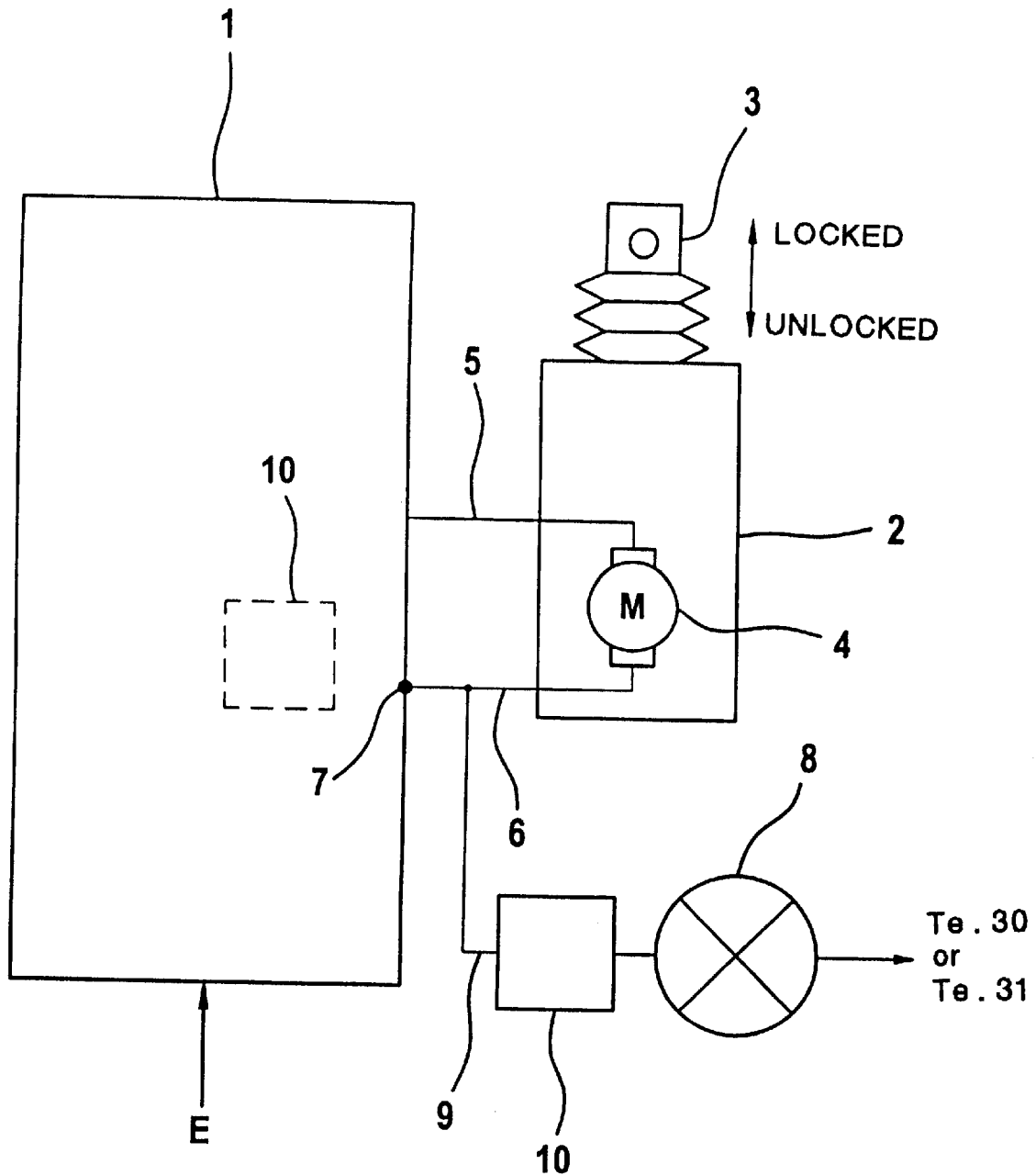

FIG. 1 shows a central locking system for a vehicle (not illustrated), which may also be, if appropriate, a watercraft or aircraft, the central locking system having a central control unit 1. This central control unit 1 may be part of a superordinate controller of the vehicle or a separate structural unit.

The central control unit 1 is electrically connected up to an actuating drive 2, the actuating drive 2 having an actuating element 3 that can be moved between the two positions "locked" and "unlocked". The actuating element 3 is connected to lock elements, such as, for example, a lever mechanism, a detent pawl or the like, of the locking device. The actuating element 3 causes the lock in the door, the tailgate or the like to be brought to the unlocked or locked state, in which case, in the unlocked state, the actuation of a handle acts on the detent pawl which, for its part, releases a rotary latch operatively connected to the detent pawl, with the result that the door, the tailgate or the like can be opened. A movement of the actuating element 3 into the other position causes the lock to be locked, which simply means that the actuation of the handle does not lead to actuation of the detent pawl, with the result that access to the vehicle is not possible since the door cannot be opened.

As an alternative to this, it is conceivable for the detent pawl to be directly actuated by means of the actuating element 3, with the result that the actuating element 3 constitutes an opening aid. Depending on the structural configuration of the actuating drive 2 with its actuating element 3 and further elements, it is conceivable for this actuating drive 2 not only to operate in the sense of an opening aid but also to be designed as a pull-shut aid. In this case, a lock element, in particular the rotary latch of the lock, is then driven by the actuating drive 2 via the actuating element 3, with the result that the door, the tailgate or the like is moved from an opened position into the closed position by means of the movement of the rotary latch.

FIG. 1 furthermore shows that the actuating drive 2 has an actuating motor 4, which actuates the actuating element 3, it also being possible for an electromagnet to be used instead of the actuating motor 4, the actuating element 3 then being designed as a plunger of the electromagnet. Furthermore, it is conceivable for the actuating motor 4 to be designed as a drive motor for a pump of a pneumatic system, with the result that the actuating element 3 is adjusted by means of negative pressure or excess pressure. An embodiment of the actuating drive 2 as an actuating drive which acts hydraulically is furthermore conceivable as well.

The actuating drive 2 is connected up to the central control unit 1 via two electrical supply leads 5, 6 and is driven in dependence on an input E. One electrical supply lead 6 is connected to an output 7 of the central control unit 1, an interior lighting 8 also being connected to said output 7 via an electrical supply lead 9. If the intention is for the interior lighting 8 to be effected jointly (dependently) by the driving of the actuating drive 2, the second supply lead (not specifically designated) of the interior lighting 8 and also the electrical supply lead 5 of the actuating drive 2 should be connected to one another or put at the same potential (ground).

If the intention is for driving of the interior lighting 8 to be effected independently of the actuating drive 2, for example during a quiescent intermission during which no unlocking or locking takes place, or during an unlocking operation, the second supply lead of the interior lighting 8 and the electrical supply lead 5 of the actuating drive 2 should be isolated from one another in potential terms.

A device 10 for the luminosity regulation (dimming) of the interior lighting 8 is additionally shown in the electrical supply lead 9, which device enables the luminosity of the interior lighting 8 to be regulated when the latter is switched on or switched off, with the result that the interior lighting 8 comes on slowly after it has been switched on and goes out slowly after the door has been closed, it being possible for this to be effected directly or with a certain time delay. Whereas FIG. 1 shows that the device 10 is arranged outside the central control unit 1, it is also conceivable for it to be arranged within an additional module or on a printed circuit board of the central control unit 1. The device 10 has at least one switching module, in particular a field-effect transistor (FET), which is driven in a pulsed manner by the central control unit 1, in particular by means of pulse width modulation, and dims the interior lighting 8. The use of a field-effect transistor has the advantage of a smaller power loss by comparison with other electronic components, with the result that there is almost no heat loss.

Input commands for the central locking system are communicated to the central control unit 1 via the input E at the central control unit 1, it being possible for these input commands to come from a remote control, from an interior pushbutton switch, from the actuation of a lock barrel or else the actuation of a handle of the door, the tailgate or the like. It is also conceivable for firstly an opening request to be communicated to the central control unit 1 via the input E and, once this opening request has been checked in respect of its admissibility and authorization and has been declared admissible, for a further input to be effected, which involves a signal that comes for example from a switch arranged on the door handle and signals to the central control unit 1 that the actuating drive 2 is to be driven.

This gives an example of a method of operation of the central locking system shown in FIG. 1; central locking systems of different construction and action are also encompassed by the invention.

List of Reference Symbols

1. Central control unit
2. Actuating drive
3. Actuating element
4. Actuating motor
5. Electrical supply lead
6. Electrical supply lead
7. Output
8. Interior lighting
9. Electrical supply lead
10. Device for luminosity regulation
E Input
Te.30 Terminal 30: Continuous positive
Te.31 Terminal 31: Ground (negative)

We claim:

1. A vehicle having a central locking system for doors, tailgates or the like, as well as at least one actuating drive and means for illuminating an interior space of the vehicle;
   with a common power output terminal;
   wherein the central locking system has a central control unit (1) with a common power output terminal;
   the means for illuminating the interior space is connected between the common power output terminal (7) of the central control unit (1) and a fixed potential, and the at least one actuating drive (2) is connected between the common power output terminal (7) and a further power output terminal; and
   the central control unit (1) controls the potential of the common power output terminal in order to switch the means for illuminating the interior space, and controls the potential of the further power output terminal in relation to the common power output terminal in order to switch the at least one actuating drive (2).

2. The vehicle as claimed in claim 1, wherein the means for illuminating the interior space can be driven independently of or in dependence on the driving of the actuating drive (2).

3. The vehicle as claimed in claim 1, wherein the means for illuminating the interior space are assigned a device (10) for luminosity regulation, which device can be driven by the central control unit (1).

4. The vehicle as claimed in claim 1, wherein the central control unit (1) is connected up to means for detecting actuation of at least one handle of the door, the tailgate or the like, both the actuating drive (2) and the means for illuminating the interior space being driven after actuation has been detected.

* * * * *